Sept. 27, 1966  W. J. SMITH  3,275,172
WRECKING AND LOADING TOOL FOR USE WITH A BACK HOE
Filed May 4, 1965  3 Sheets-Sheet 1

INVENTOR
Wedad J. Smith

BY Wilkinson, Mawhinney & Theibault
ATTORNEY

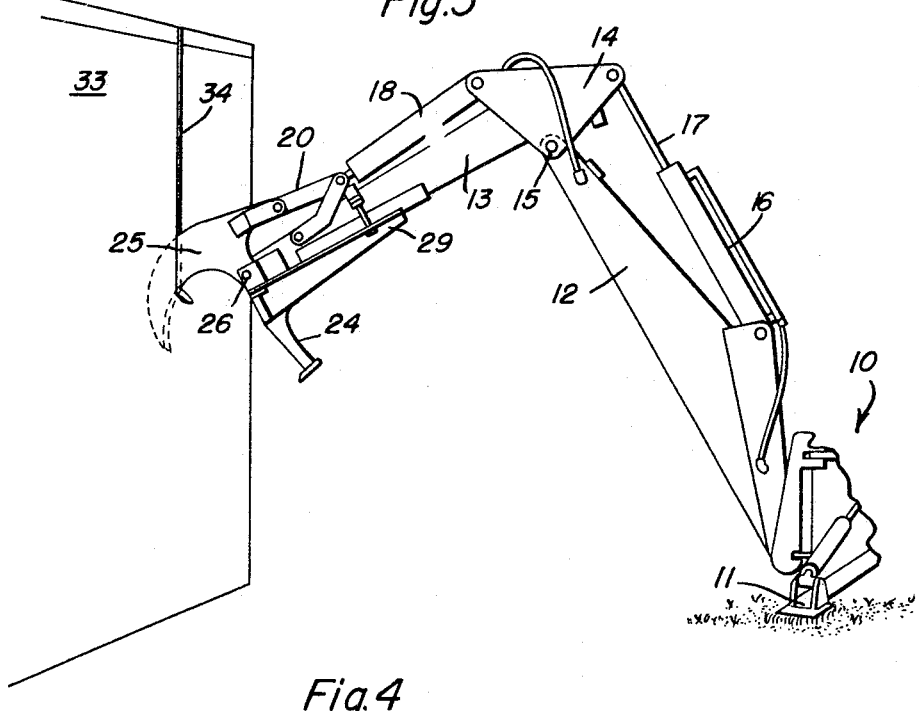
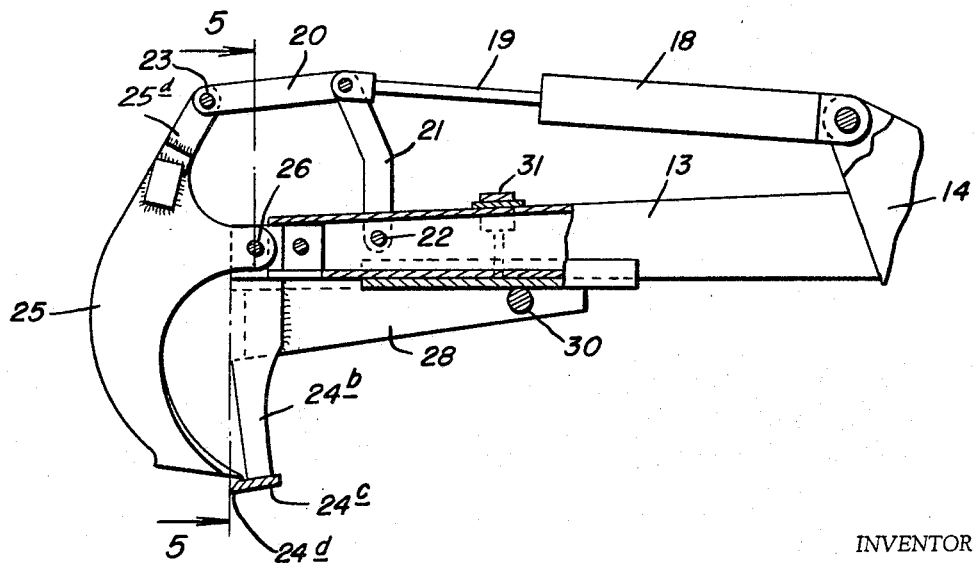

Sept. 27, 1966   W. J. SMITH   3,275,172
WRECKING AND LOADING TOOL FOR USE WITH A BACK HOE
Filed May 4, 1965   3 Sheets-Sheet 3
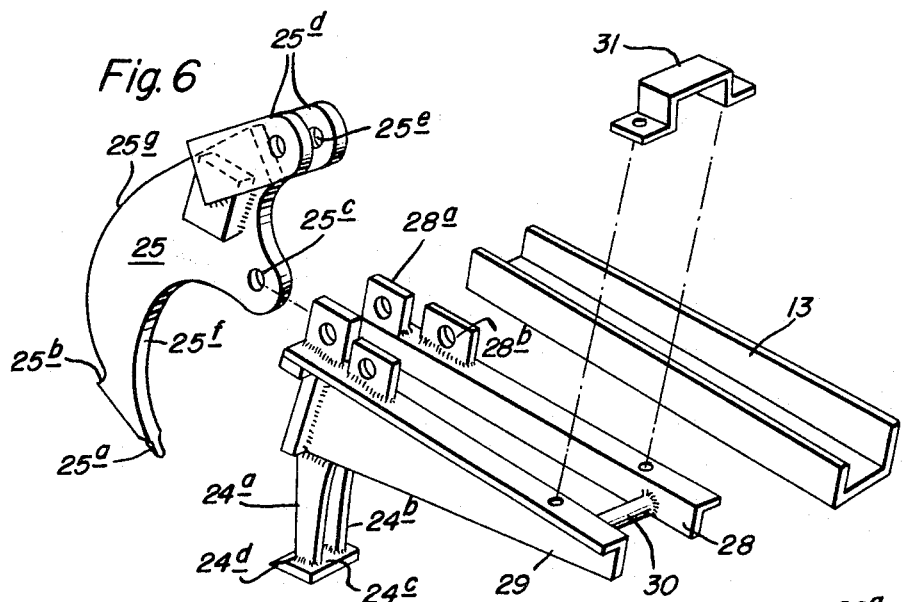
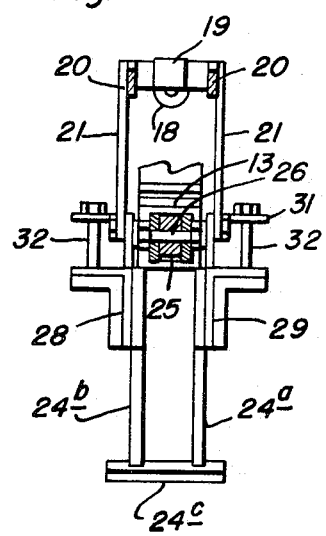
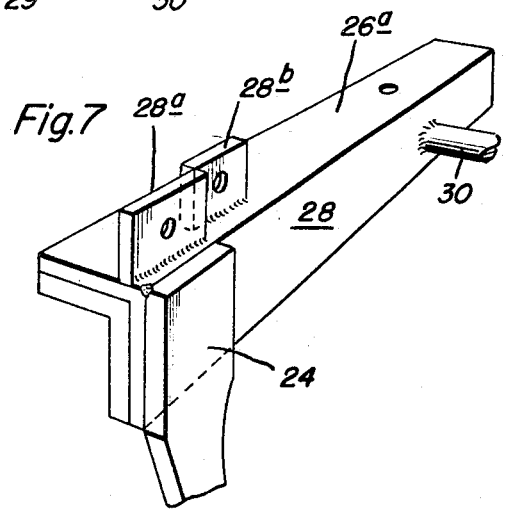
INVENTOR
Wedad J. Smith
BY Wilkinson, Mawhinney &
Theibault
ATTORNEY United States Patent Office 3,275,172
Patented Sept. 27, 1966

3,275,172
WRECKING AND LOADING TOOL FOR USE WITH A BACK HOE
Wedad J. Smith, El Paso, Tex., assignor to Wrex-All Implements, Inc., Thibodaux, La., a corporation of Louisiana
Filed May 4, 1965, Ser. No. 453,066
4 Claims. (Cl. 214—138)

The present invention relates to a wrecking and loading tool for use with back hoe and has for an object to provide an implement which may be attached to the free end of the dipstick of a back hoe after the conventional earth moving bucket has been removed therefrom.

Another object of the present invention is to provide an implement for use with a back hoe which will increase the use-time of a back hoe and expand its field of endeavor beyond that of earth moving and the field of wrecking and loading as well as pulling tree stumps and other allied removal tasks.

A still further object of the present invention is to provide a wrecking and loading tool attachment for a back hoe, rugged in construction, simple in design, which may be placed on and removed from the back hoe dipstick in a minimum of time.

A still further object of the present invention is to provide an implement attachment which will permit the destruction of junked automobiles, metal freight cars in a train wreck, and other situations requiring metal tearing and pulling attributes of the instant invention.

With the foregoing and other objects in view, the invention will be more fully described hereinafter, and will be more particularly pointed out in the claims appended hereto.

In the drawings, wherein like symbols refer to like or corresponding parts throughout the several views:

FIGURE 3 is a view similar to FIGURES 1 and 2 in which the wrecking implement is shown tearing a freight car side.

FIGURE 4 is a fragmentary side elevational view with parts broken away and parts shown in section of the wrecking implement of the present invention attached to the dipstick of a back hoe.

FIGURE 5 is a vertical section taken on the lines 5—5 in FIGURE 4.

FIGURE 6 is an exploded perspective view of the implement of FIGURE 4.

FIGURE 7 is a fragementary perspective view showing the manner of attachment of the static jaw to the implement assembly.

Figure 1:
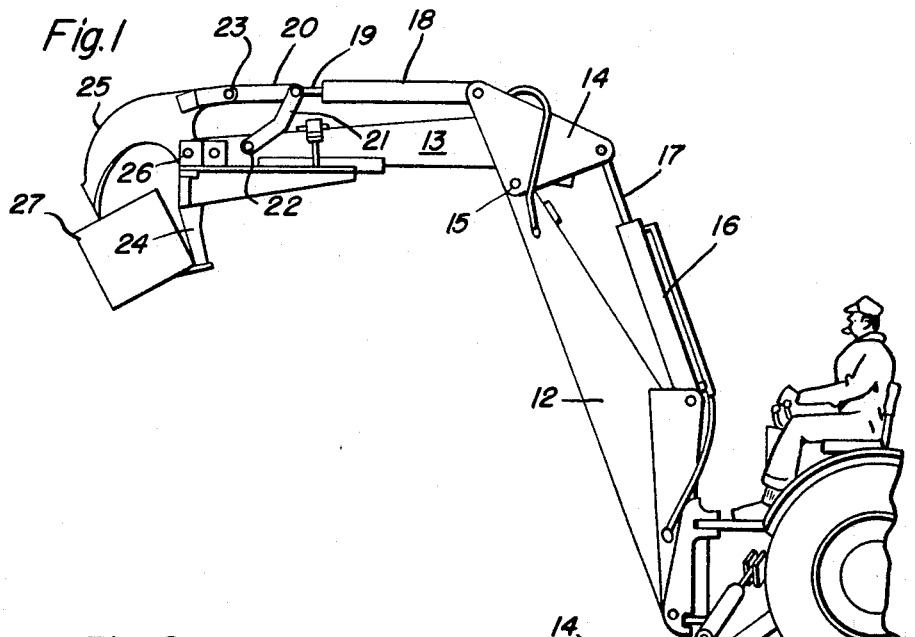
FIGURE 1 is a fragmentary side elevational view of a back hoe equipped with the wrecking and loading tool of the present invention showing the tool as applied to loading.

Referring more particularly to the drawings and for the moment to FIGURE 1, 10 designates a back hoe of conventional construction having outrigger stabilizers 11. Secured to the back hoe for movement up and down about the vertical plane and movable horizontally is a mast 12 to which is connected a dipstick 13 through a plate 14 pivoted at the free end of the mast 12 at the pivot 15. The plate 14 and its connected dipstick 13 are movable up and down about the pivot 15 through a cylinder 16 and ram 17 connected between the back hoe 10 and the plate 14. Secured at one of its ends to the plate 14 is a cylinder 18 which actuates a ram 19 which through linkages 20 and 21 actuates the wrecking and loading implement.

One end of the link 21 is pivotally connected to the dipstick 22 and the free end of the link 20 and pivotally connected at 23 to the movable jaw of the wrecking and loading tool. In conventional hoe practice, an earth moving bucket is pivotally connected to the end of the dipstick 13, however when it is desired to use the back hoe for wrecking and loading, the conventional bucket is removed and the device of the instant invention is put in its stead.

The detail construction of the wrecking and loading tool can best be seen in FIGURES 4 and 6 from which it will be noted that the implement is provided with a static jaw 24 which is secured to a dipstick attaching means 28. The dipstick attaching means 28 consists of a pair of spaced angle plates 28 and 29 joined by a spacer rod 30 being welded thereto. As shown in FIGURE 6, the dipstick 13 is placed over the spacer 30 and a cover plate 31 is bolted over the dipstick 13 and retained in place by bolts 32.

The static jaw 24 comprises a pair of spaced apart jaws $24^a$ and $24^b$ welded to the angle plates 28 and 29. The static jaws have a butt plate $24^c$ connected across the bottom ends which butt plate $24^c$ has a leading edge $24^d$.

The dipstick attaching means 28 has upstanding lugs $28^a$ perforated to receive a pivot bolt 26 which passes through the opening $25^c$ in the movable jaw 25. As best seen in FIGURE 6 the movable jaw is of a crescent shape having an outer curved surface $25^g$ and an inner curved surface $25^f$ terminates in a point $25^a$ and at a point removed along the length of the outer curved surface $25^g$ in a direction away from the leading point $25^a$ is an under cut lip $25^b$ to define along the outer curved surface $25^g$ and under cut abrupt projection-like surface for engaging objects to be moved or nudged. The leading point $25^a$ and the movable jaw 25 might be best designated as the nose of the movable jaw and at the tail portion of the movable jaw 25 are located lugs $25^d$ which have been welded to the movable jaw 25 and which are provided with openings $25^e$ to receive the pivot bolt 23 therethrough for joining the movable jaw 25 with the actuating link 20.

As best seen in FIGURES 5 and 6, the jaws $24^a$, $24^b$ are spaced apart to receive therebetween the movable jaw 25 in the manner shown in FIGURE 4.

*In operation*

By way of example, when it is desired to move an object from one point to another as shown in FIGURE 1, the back hoe is set up with the outriggers 11 in their support position and the implement engages the object 27 to be moved, such that the object 27 rests against the butt plate $24^c$ and its leading edge $24^d$ of the static jaw 24 while the movable jaw 25 closes upon the object 27 such that the leading edge $25^a$ is in gripping engagement with the object 27. The machine operator can control the relative movement of the static jaw 24 and the movable jaw 25 through the bucket control lever which controls the actuating of cylinder 18 and its ram 19 which through linkage 20, pivot bolt 23 and lugs $25^d$ will move the jaw 25 about the pivot bolt 26.

Figure 2:
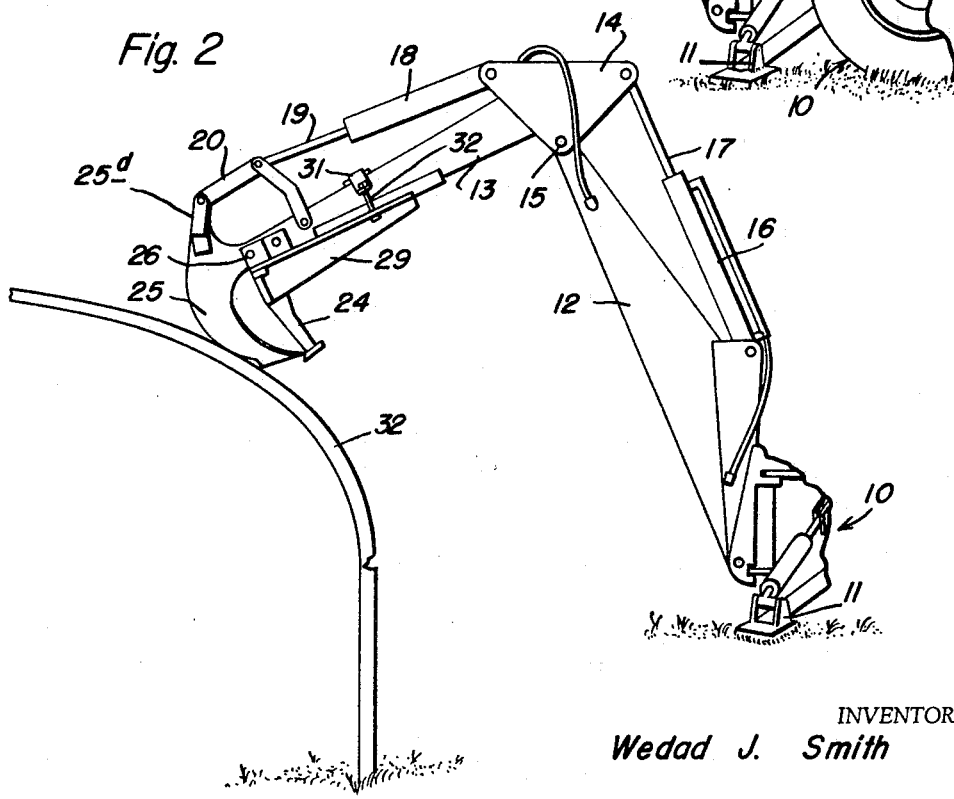
FIGURE 2 is a fragmentary side elevational figure similar to FIGURE 1 showing the wrecking and loading tool of the present invention being used to push over or break and assist in demolition of an object.

When the back hoe is being used to knock down metal buildings or the like, the tool may be applied as shown in FIGURE 2 by securing same to dipstick 13 and pressing the crescent shape of the movable jaw against the object and upon actuation of cylinder 16 the dipstick will be directed downwardly about pivot 15 to force the wall 32 of a building under demolition to be bent.

A further example of the utility of the wrecking and loading tool as applied to the back hoe is seen in FIGURE 3 in which the movable jaw 25 is being employed as a can opener in ripping up a metal freight car which has been in a train werck by inserting the pointed leading edge of the movable jaw $25^a$ into the opening at the top of the freight car side wall 33 and then by actuation of cylinder and ram assembly 16 and 17 a rip 34 is obtained. This will permit badly damaged freight cars to be reduced to flat sized sheet metal for quick and ready transportation from scene of the train wreck.

The implement as shown and described shows utility in ripping up and destroying junked automobiles by tearing and pulling the same apart.

The implement of the present invention may also be employed for chopping or breaking up of trees and the removal of tree stumps.

The foregoing is a demonstration of the adaptability of the present invention and shows the many uses it may have, but, however, it is to be noted that this implement is readily attachable to and removed from the free end of the dipstick of a back hoe which will increase the utility of the back hoe to the owner or lessor thereof and the conversion from the regular back hoe to a wrecking device requires a minimum of time by merely removing the bucket and using the same linkage to connect the wrecking and loading implement. The extent to which the implement of the present invention will increase back hoe use and utility will be at least 40 percent.

Although I have disclosed herein the best forms of the invention known to me at this time, I reserve the right to all such modifications and changes as may come within the scope of the following claims.

What is claimed is:
1. For use with a back hoe or the like the bucket of which has been removed having a dipstick, actuating cylinder and ram connected to an actuating linkage; a wrecking and loading tool comprising

(a) tool attaching means adapted to be secured to the free end of the dipstick and having a securing element adapted to removably secure said tool attaching means to said dipstick,
(b) static jaw means rigidly secured to said tool attaching means, and
(c) a movable jaw crescent shaped having a pointed free end movably mounted on said tool attaching means positioned to cooperate with the static jaw and adapted to be connected to the ram so as to engage objects between said jaws so that the tool and dipstick can transfer the object to be moved.

2. A wrecking and loading tool as claimed in claim 1 further comprising an undercut lip removed from the pointed free end along the top of the crescent shaped movable jaw.

3. A wrecking and loading tool as claimed in claim 1, wherein said static jaw means are spaced members which receive the crescent shaped movable jaw therebetween.

4. A wrecking and loading tool as claimed in claim 2 further comprising a tail piece extension on the movable jaw for connection to the actuating linkage.

References Cited by the Examiner
UNITED STATES PATENTS 2,044,624  6/1936  Morgan _____ 214—138
2,966,180  12/1960  Bles _____ 214—138 X

FOREIGN PATENTS 575,948  5/1959  Canada.

HUGO O. SCHULZ, *Primary Examiner.*